United States Patent
Shi et al.

(10) Patent No.: US 10,561,925 B2
(45) Date of Patent: Feb. 18, 2020

(54) INTELLIGENT FITNESS SYSTEM AND CONTROL METHOD THEREOF

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Xiaodong Shi, Beijing (CN); Quanzhong Wang, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

(*) Notice: Subject to any disclaimer, the term of this patent is extended or adjusted under 35 U.S.C. 154(b) by 124 days.

(21) Appl. No.: 15/817,436

(22) Filed: Nov. 20, 2017

(65) Prior Publication Data

US 2018/0256961 A1  Sep. 13, 2018

(30) Foreign Application Priority Data

Mar. 10, 2017  (CN) .......................... 2017 1 0141803

(51) Int. Cl.
*A63B 71/06* (2006.01)
*A63B 21/005* (2006.01)
(Continued)

(52) U.S. Cl.
CPC ........ *A63B 71/0622* (2013.01); *A63B 21/005* (2013.01); *A63B 22/0605* (2013.01);
(Continued)

(58) Field of Classification Search
CPC ......... A63B 71/0622; A63B 2071/0636–0644; A63B 2024/0096;
(Continued)

(56) References Cited

U.S. PATENT DOCUMENTS

| 5,888,172 | A  | * | 3/1999 | Andrus ................ A61B 5/6887 482/7 |
| 2004/0097331 | A1 | * | 5/2004 | Zillig ...................... A63F 13/23 482/8 |

(Continued)

FOREIGN PATENT DOCUMENTS

| CN | 203677870 U | 7/2014 |
| CN | 204619280 U | 9/2015 |

(Continued)

OTHER PUBLICATIONS

First Office Action for Chinese Application No. 201710141803.2, dated Jun. 4, 2018, 8 Pages.

*Primary Examiner* — Jennifer M Deichl
(74) *Attorney, Agent, or Firm* — Brooks Kushman P.C.

(57) ABSTRACT

The present disclosure provides an intelligent fitness system and a control method thereof. The intelligent fitness system includes a fitting device, a plurality of physical buttons arranged on a handle of the fitting device at positions corresponding to fingers of a user respectively, a controller electrically connected to the physical buttons, and a display device electrically connected to the controller. Each physical button is configured to collect an operation instruction from the user and transmit the operation instruction to the controller. The controller is configured to transmit the operation instruction to the display device. The display device is configured to display a corresponding image in accordance with the operation instruction.

8 Claims, 3 Drawing Sheets

(51) Int. Cl.
  *A63B 24/00* (2006.01)
  *A63F 13/85* (2014.01)
  *A63B 71/00* (2006.01)
  *A63F 13/428* (2014.01)
  *G06F 3/0346* (2013.01)
  *G06F 3/0487* (2013.01)
  *A63B 22/06* (2006.01)
  *G06F 3/02* (2006.01)
  *A63F 13/212* (2014.01)
  *A63F 13/24* (2014.01)
  *A42B 3/04* (2006.01)
  *A63B 22/02* (2006.01)
  *A63B 22/04* (2006.01)
  *A63B 22/00* (2006.01)

(52) U.S. Cl.
  CPC ...... *A63B 24/0087* (2013.01); *A63B 71/0054* (2013.01); *A63F 13/212* (2014.09); *A63F 13/428* (2014.09); *A63F 13/85* (2014.09); *G06F 3/0202* (2013.01); *G06F 3/0346* (2013.01); *G06F 3/0487* (2013.01); *A42B 3/0433* (2013.01); *A63B 22/0076* (2013.01); *A63B 22/02* (2013.01); *A63B 22/04* (2013.01); *A63B 2024/0096* (2013.01); *A63B 2071/0625* (2013.01); *A63B 2220/30* (2013.01); *A63B 2220/40* (2013.01); *A63B 2220/803* (2013.01); *A63B 2225/50* (2013.01); *A63B 2230/062* (2013.01); *A63F 13/24* (2014.09)

(58) Field of Classification Search
  CPC .. A63B 22/06–2022/0658; A63B 2220/30–36; A63B 69/16–2069/168; A63F 13/428
  See application file for complete search history.

(56) References Cited

U.S. PATENT DOCUMENTS

2014/0066201 A1  3/2014  Huang et al.
2016/0300390 A1* 10/2016 Malafeew ............. A63F 13/245

FOREIGN PATENT DOCUMENTS

CN  205872278 U  1/2017
CN  205903583 U  1/2017

* cited by examiner

INTELLIGENT FITNESS SYSTEM AND CONTROL METHOD THEREOF

CROSS-REFERENCE TO RELATED APPLICATION

This application claims priority to Chinese Patent Application No. 201710141803.2 filed on Mar. 10, 2017, which is incorporated herein by reference in its entirety.

TECHNICAL FIELD

The present disclosure relates to the field of intelligent fitness technology, in particular to an intelligent fitness system and a control method thereof.

BACKGROUND

Recently, along with the growth in the living standard, people pay more and more attention to fitness, and development of the fitting device market has been on the rise year by year. Due to the implementation of fitness plans, the growth of the living standard and the change in consumption concept, functions of a fitting device are highly demanded. For the fitting device, e.g., a treadmill, an exercise bicycle or a rowing machine, its fitness function is achieved by simulating outdoor sports. The exercise bicycle is also called as "cycle ergometer" which is capable of adjusting an exercise intensity (power), so as to improve a fitness effect. As aerobics exercise equipment, the exercise bicycle is also called as cardiorespiratory training equipment, which is used to improve a cardiovascular system through a long-term exercise at a suitable intensity, so as to speed up metabolism and enhance heart and lung functions, thereby to improve the physical fitness.

For the above-mentioned fitting device, the long-term exercise is so boring, so some fitting device having an entertainment function has emerged. For example, a display panel is mounted on the treadmill, so a user may watch a video program while running. However, in the case of changing the video program, the user needs to stop running and perform operations on the display panel, so the entire operation is inconvenient and an exercise effect may be adversely affected. In addition, although with the entertainment functions, usually a single interaction mode is provided and the operation thereof is inconvenient, so it is impossible to meet the user's requirement and enable the user to keep exercise for a long time period.

SUMMARY

In one aspect, the present disclosure provides in some embodiments an intelligent fitness system, including a fitting device, a plurality of physical buttons arranged on a handle of the fitting device at positions corresponding to fingers of a user respectively, a controller electrically connected to the physical buttons, and a display device electrically connected to the controller. Each physical button is configured to collect an operation instruction from the user and transmit the operation instruction to the controller. The controller is configured to transmit the operation instruction to the display device. The display device is configured to display a corresponding image in accordance with the operation instruction.

In a possible embodiment of the present disclosure, the intelligent fitness system further includes a plurality of data collectors fixed onto the fitness device. Each data collector is electrically connected to the controller and configured to acquire exercise data of the user and transmit the exercise data to the controller. The controller is further configured to transmit the exercise data to the display device. The display device is further configured to display the corresponding image in accordance with the exercise data.

In a possible embodiment of the present disclosure, the data collectors include a heart rate collector fixed onto the fitness device.

In a possible embodiment of the present disclosure, the fitness device is an exercise bicycle, and the data collectors include a velometer fixed onto the exercise bicycle and configured to measure information about a rotational speed of each wheel of the exercise bicycle in the case that the wheel is rotating.

In a possible embodiment of the present disclosure, the velometer includes a plurality of permanent magnets fixed onto a rim of each wheel of the exercise bicycle at a regular interval, and a Hall sensor fixed onto the exercise bicycle and located within a magnetic field of the permanent magnets.

In a possible embodiment of the present disclosure, the velometer includes an infrared ray emitter and an infrared ray receiver fixed onto the exercise bicycle and located at two sides of the wheel respectively, and a plurality of convex structures fixed onto the rim of the wheel at a regular interval and configured to shield an infrared ray from the infrared ray emitter.

In a possible embodiment of the present disclosure, the display device includes a processor and a display module electrically connected to the processor. The processor is configured to control the display module to display the corresponding image in accordance with the received exercise data and/or operation instruction.

In a possible embodiment of the present disclosure, the intelligent fitness system further includes a helmet, and an acceleration sensor and a gyroscope arranged on the helmet and electrically connected to the processor. The processor is further configured to control the display module to display the corresponding image in accordance with acceleration information acquired by the acceleration sensor and angle information acquired by the gyroscope.

In a possible embodiment of the present disclosure, the display device is a virtual reality (VR) display device or augmented reality (AR) display device.

In another aspect, the present disclosure further provides a control method of the intelligent fitness system, including steps of: collecting, by the physical buttons, an operation instruction from a user, and transmitting the operation instruction to the controller; transmitting, by the controller, the operation instruction to the display device; and displaying, by the display device, a corresponding image in accordance with the operation instruction.

DETAILED DESCRIPTION

Figure 1:
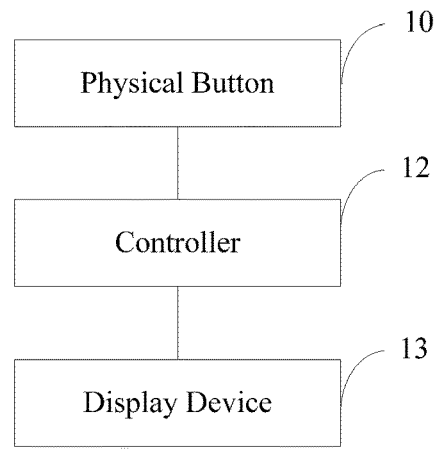
FIG. 1 is a schematic view showing an intelligent fitness system according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In the related art, a single interaction mode is provided by the fitness device, so a user may not take exercise for a long time period. In order to solve this problem, the present disclosure provides in some embodiments an intelligent fitness system and a control method thereof.

The present disclosure will be described hereinafter in conjunction with the drawings and embodiments. A size and a shape of each structure in the drawings are for illustrative purposes only, but shall not be used to reflect an actual scale.

The present disclosure provides in some embodiments an intelligent fitness system which, as shown in FIG. 1, includes: a fitting device, a plurality of physical buttons 10 arranged on a handle of the fitting device at positions corresponding to fingers of a user respectively, a controller 12 electrically connected to the physical buttons 10, and a display device 13 electrically connected to the controller 12. Each physical button 10 is configured to collect an operation instruction from the user and transmit the operation instruction to the controller 12. The controller 12 is configured to transmit the operation instruction to the display device 13. The display device 13 is configured to display a corresponding image in accordance with the operation instruction.

According to the intelligent fitness system in the embodiments of the present disclosure, the plurality of physical buttons 10 is fixed onto the handle of the fitness device at the positions corresponding to the fingers of the user, and the controller 12 controls the display device 13 to display the corresponding image in accordance with the operation instruction collected by each physical button 10. As a result, it is able for the user to, on one hand, operate the display device conveniently in the case of taking exercise so as to achieve a corresponding function, and on the other hand, it is able to provide more interaction modes so as to improve the user experience.

The fitness device may be an exercise bicycle, a treadmill, a stair climber or a rowing machine, and the types thereof will not be particularly defined herein. The controller 12 may be a microprocessor 131 or microcontroller 12 having a data processing function, such as a microcontroller unit (MCU) or a Field-Programmable Gate Array (FPGA). The controller 12 may transmit the operation instruction from each physical button 10 to the display device 13, or process the operation instructions received within a certain time period (e.g., 1s) and transmit the resultant data, in a packet form, to the display device 13. The operation instruction may be transmitted by the controller 12 to the display device 13 in a wired or wireless (e.g., Bluetooth) manner, and in a possible embodiment of the present disclosure, a Bluetooth module capable of supporting Bluetooth Low Energy (BLE) may be used. A transmission mode of the data from the controller 12 to the display device 13 will not be particularly defined herein.

The display device 13 may be any device having a display function, such as a liquid crystal display device or an organic light-emitting diode (OLED) display device. The user may watch various programs through the display device 13 in the case of taking exercise, and control the content through the physical buttons. Also, the user may play various games through the display device 13 in the case of taking exercise, e.g., various competitive games or puzzle video games.

The physical buttons 10 may be of any types, e.g., push-buttons, touch buttons or ergonomic buttons. Through the plurality of physical buttons, it is able for the user to control the display device 13 to perform the corresponding operation and display the corresponding image conveniently. For example, a television program played by the display device 13 or such parameters of the display device 13 as volume or brightness may be selected through the physical button 10. In the case that the display device 13 is provided with a gaming function, the plurality of physical buttons 10 may simulate a function of a joystick, so as to perform gaming operations. For example, a character in a competitive game may be controlled to perform such operations as moving left or right, jumping or speeding-up through the physical buttons 10, so as to provide more control functions. Apart from the competitive games, the characters in some other games, e.g., shooting games, simulation games or adventure games, may also be controlled through the physical buttons 10. In a word, through the plurality of physical buttons 10, it is able to provide various games for the intelligent fitness system, thereby to improve the user experience. In addition, the physical buttons 10 are arranged on the handle at the positions corresponding to the fingers of the user, so it is able for the user, at any time, to control the program played by the display device or play various games in the case of taking exercise, thereby to improve the user's motivation and stickiness to take exercise.

Figure 2A:
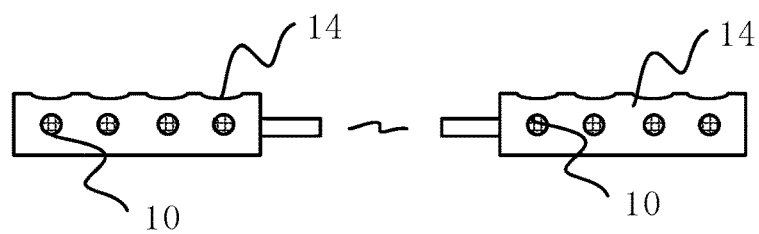
FIG. 2a is a schematic view showing the distribution of physical buttons according to one embodiment of the present disclosure.
Figure 2B:
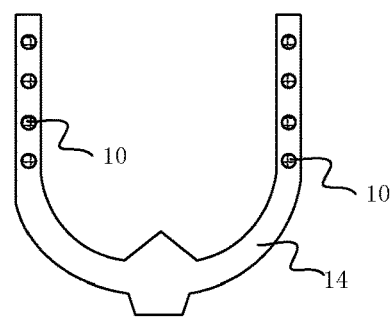
FIG. 2b is a schematic view showing the distribution of the physical buttons of an exercise bicycle according to one embodiment of the present disclosure.

As shown in FIGS. 2a and 2b, in a possible embodiment of the present disclosure, in order to facilitate the user's operation, the physical buttons 10 may be arranged on the handle 14 of the fitness device at the positions corresponding to the fingers of the user, and usually at most ten physical buttons may be provided. In FIGS. 2a and 2b, eight circular physical buttons 10 are provided as an example. Of course, the physical buttons 10 may be of any other shapes. Actually, the number and the shape of the physical buttons 10 will not be particularly defined herein.

Figure 3:
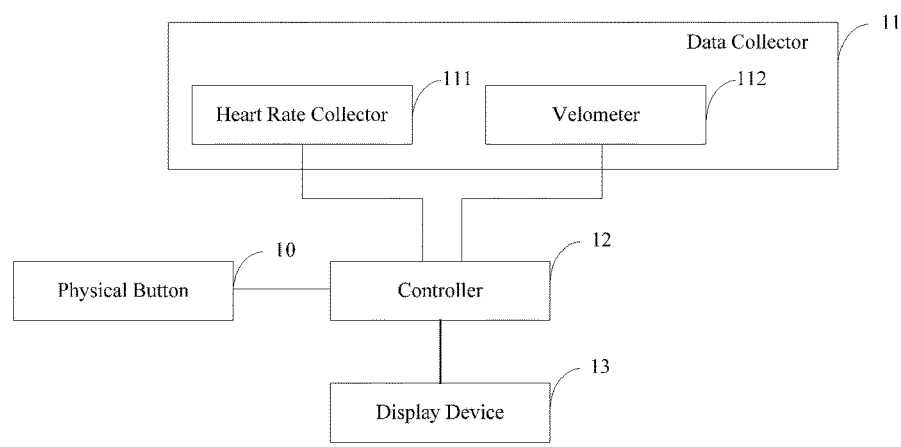
FIG. 3 is another schematic view showing the intelligent fitness system according to one embodiment of the present disclosure.

As shown in FIG. 3, the intelligent fitness system may further include a plurality of data collectors fixed onto the fitness device. Each data collector is electrically connected to the controller and configured to collect exercise data of the user and transmit the exercise data to the controller. The controller is further configured transmit the exercise data to the display device. The display device is further configured to display the corresponding image in accordance with the exercise data.

Through the data collectors on the fitness device, the controller may control the display device to display the corresponding image in accordance with the exercise data collected by the data collectors, e.g., the controller may control the display device to change the program in accordance with the exercise data. To be specific, in the case that the user takes exercise at a high intensity, some high-pitched music may be played, and in the case that the user takes exercise at a low intensity, some subdued music may be played. Also, the user may play various competitive games through the display device in accordance with the exercise data. For example, in the case that the user takes exercise at a high intensity, a character in the game may make a quick response. In this way, it is able to provide the user with more interaction modes in the case of taking exercise, thereby to improve the user experience.

The controller may transmit the exercise data collected by the data collectors to the display device, or process the exercise data received within a certain time period (e.g., 1 s) and the operation instructions and then transmit the resultant data, in a packet form, to the display device, in a wired or wireless manner. In a possible embodiment of the present disclosure, a Bluetooth module capable of supporting a BLE function may be used. A transmission mode of the data from the controller to the display device will not be particularly defined herein.

As shown in FIG. 3, the data collector 11 may include a heart rate collector 111 fixed onto the fitness device.

Through the heart rate collector 111 on the fitness device, it is able to monitor in real time a heart rate of the user in the case of taking exercise, and display a real-time heart rate of the user through the display device 13. In the case that the heart rate of the user is too high, an alarm may be sent so as to prompt the user to stop taking exercise. In the case that the heart rate of the user is within a normal range, the content displayed by the display device 13 may be changed in accordance with the heart rate. For example, in the case that the user is playing a competitive game, a state of a character in the game may be changed in accordance with the heart rate. To be specific, in the case that the heart rate of the user is relatively high, the display device 13 may be controlled in such a manner as to provide the character with a sweaty or puffy effect, or display some words to motivate the user to keep exercise, or play some high-pitched songs, so as to improve the user experience.

During the implementation, the heart rate collector 111 may be of a photoelectric, electrocardiographic or vibration type, and in a possible embodiment of the present disclosure, the photoelectric heart rate collector may be used. Blood may absorb a light beam at a specific wavelength each time the heart beats, so it is able to determine the heart rate. Based on this principle, the heart rate collector 111 may be arranged on the handle 14 of the fitness device, and it may include two green-light light-emitting diode (LED) lamps and one photosensitive sensor. In the case of the pulsatile blood flow in the palm or finger, a blood density may change, and thereby the light transmittance may change too. Each LED lam may emit a green light beam, and the photosensitive sensor may receive a light beam reflected by the skin, detect a change in a light field intensity and convert it into the heart rate.

As shown in FIG. 3, the following description will be given by taking an exercise bicycle as an example. During the implementation, the fitness device is the exercise bicycle, and the data collectors 11 further include a velometer 112 fixed onto the exercise bicycle and configured to measure information about a rotational speed of each wheel 15 of the exercise bicycle in the case that the wheel 15 is rotating.

Through the velometer 112 arranged on the exercise bicycle, it is able to acquire in real time the information about the rotational speed of the wheel 15 in the case that the user takes exercise, and control the display device 13 to achieve a corresponding function in accordance with the information. For example, in the case that the user is playing a competitive game, the controller may control a speed of a character or a racing car in the game in accordance with the information. To be specific, the larger the rotational speed, the quicker the character or racing car. In this way, it is able to motivate the user to speed up.

As shown in FIG. 3, the exercise bicycle may also include the physical buttons 10 and the heart rate collector 111 as mentioned above. FIG. 2b shows the physical buttons 10 and the handle 14 of the exercise bicycle.

During the implementation, the velometer 112 may be provided in the following modes.

Figure 4:
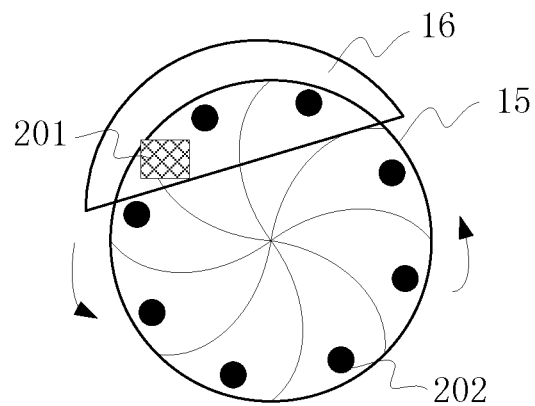
FIG. 4 is a schematic view showing a velometer according to one embodiment of the present disclosure.

Mode 1: as shown in FIG. 4, the velometer 112 includes a plurality of permanent magnets 202 fixed onto a rim of each wheel 15 of the exercise bicycle at a regular interval, and a Hall sensor 201 fixed onto the exercise bicycle and located within a magnetic field of the permanent magnets.

The Hall sensor 201 is a magneto-dependent sensor designed on the basis of a Hall effect and an Integrated Circuit (IC) technique. The Hall sensor 201 is provided with a Hall semiconductor sheet. When a constant current flows through the Hall semiconductor sheet in a horizontal direction, under the effect of a Lorentz force in the magnetic field, a stream of electrons may be deviated toward a side of the Hall semiconductor sheet, so as to generate a potential difference in a vertical direction, i.e., a Hall voltage. Due to the Hall voltage, any magnetism-related physical quantity may be converted into a pulse signal which may be measured easily. On the basis of this principle, the permanent magnets 202 are fixed onto the rim of the wheel 15 and rotate along with the wheel 15. In the case that each permanent magnet 202 passes by the Hall sensor 201, a corresponding pulse signal may be generated by the Hall sensor 201. A time interval between two consecutive pulse signals may be determined, so as to calculate the rotational speed.

As shown in FIG. 4, the plurality of permanent magnets 202 are fixed onto the rim of the wheel 15 at a regular interval, and the Hall sensor 201 is fixed onto a bracket of the exercise bicycle. In the case that each permanent magnet 202 passes by the Hall sensor 201, a pulse signal may be generated. Because the permanent magnets 202 are arranged at a regular interval, it is able to measure a distance L between every two permanent magnets 202. The controller 12 may calculate a time difference Δt between two pulse signals. The rotational of each permanent magnet 202 passing by the Hall sensor 201 may be approximately calculated using the following equation: $v=L/\Delta t$.

Based on the above equation, the more the permanent magnets 202 on the wheel 15 and the smaller the distance L between two adjacent permanent magnets 202, the closer the acquired rotational speed to an actual rotational speed. In other words, the more the permanent magnets 202 on the wheel 15, the more precise the rotational speed, and the larger possibility the display device 13 is controlled in real time. For example, in the case that a game interface is displayed on the display device 13, a speed of a character or racing car in a competitive game may be controlled in accordance with the information about the rotational speed. The more the permanent magnets 202, the more frequently the information about the rotational speed is updated. In this way, it is able to increase a sense of immersion in the game and motivate the user to keep exercise. In FIG. 4, eight permanent magnets 202 are provided. During the implementation, the number of the permanent magnets 202 will not be particularly defined herein, and if allowed, the more the permanent magnets 202, the better.

Figure 5A:
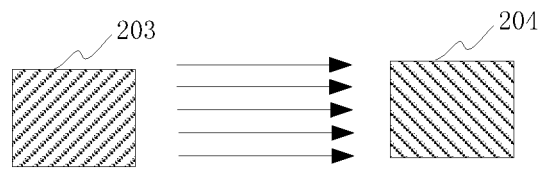
FIG. 5a is another schematic view showing the velometer according to one embodiment of the present disclosure.
Figure 5B:
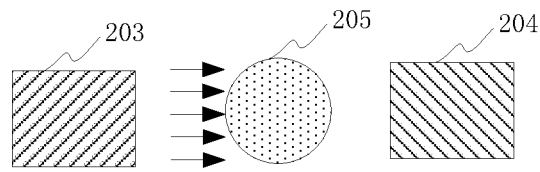
FIG. 5b is yet another schematic view showing the velometer according to one embodiment of the present disclosure.
Figure 5C:
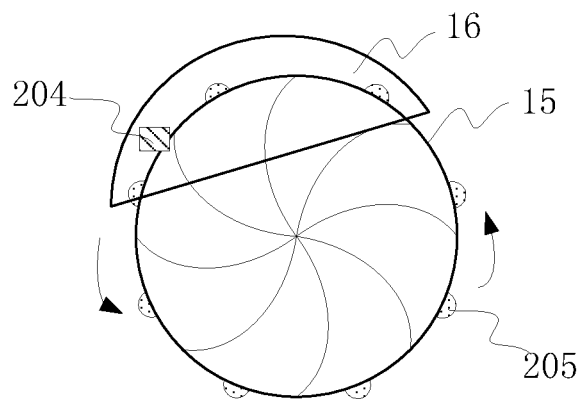
FIG. 5c is still yet another schematic view showing the velometer according to one embodiment of the present disclosure.

Mode 2: as shown in FIGS. 5a, 5b and 5c, the velometer 112 includes an infrared ray emitter and an infrared ray receiver fixed onto the exercise bicycle and located at two sides of the wheel 15 respectively, and a plurality of convex structures 205 fixed onto the rim of the wheel 15 at a regular interval and configured to shield an infrared ray from the infrared ray emitter.

As shown in FIG. 5a, the infrared ray emitter 203 and the infrared ray receiver 204 are arranged opposite to each other at the two sides of the wheel 15 respectively. In the case that the convex structure 205 does not shield the infrared ray, the infrared ray receiver 204 may receive the infrared ray from the infrared ray emitter 203. The convex structures 205 on the rim of the wheel 15 may rotate along with the wheel 15, and in the case that the corresponding convex structure 205 has been rotated to a position between the infrared ray emitter 203 and the infrared ray receiver 204, as shown in FIG. 5b, the infrared ray from the infrared ray emitter 203 may be shielded by the convex structure 205, so that the infrared ray receiver 204 cannot receive the infrared ray. In this way, it is able to acquire the information about the rotational speed of the wheel 15 in accordance with a time interval between two adjacent shielded infrared rays and a distance between two adjacent convex structures 205 through an equation similar to that mentioned in Mode 1, which will not be particularly defined herein.

As shown in FIG. 5c, the infrared ray emitter 203 and the infrared ray receiver 204 may be arranged onto the frame 16 of the exercise bicycle, and the convex structures 205 may be arranged on the rim of the wheel 15 at a regular interval. Similar to Mode 1, the more the convex structures 205, the closer the acquired rotational speed to an actual rotational speed. In other words, the more the convex structures 205 on the wheel 15, the more precise the measured rotational speed, and the larger possibility the display device 13 is controlled in real time. Also similar to Mode 1, through the plurality of convex structures 205, it is able to increase a sense of immersion in the game and motivate the user to keep exercise. In FIG. 5c, eight convex structures 205 are provided. During the implementation, the number of the convex structures 205 will not be particularly defined herein, and if allowed, the more the convex structures 205, the better.

Figure 6:
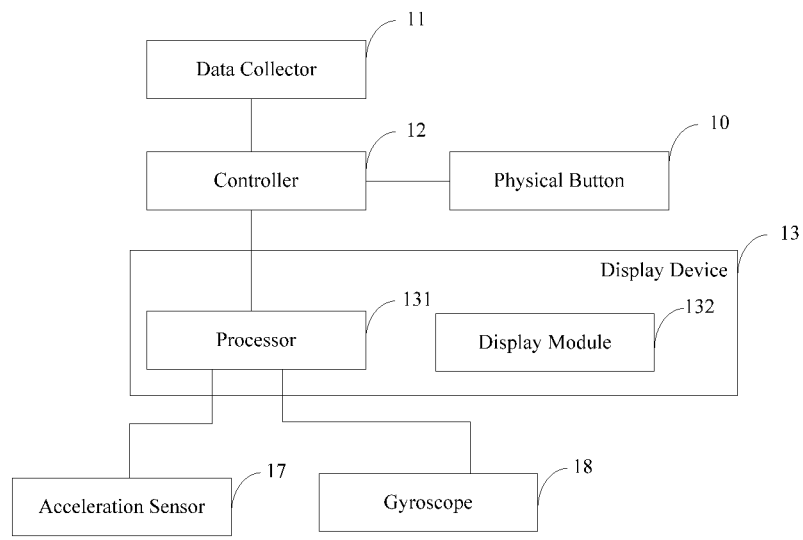
FIG. 6 is yet another schematic view showing the intelligent fitness system according to one embodiment of the present disclosure.

As shown in FIG. 6, the display device 13 includes a processor 131 and a display module 132 electrically connected to the processor 131. The processor 131 is configured to control the display module 132 to display the corresponding image in accordance with the received exercise data and/or operation instruction.

In FIG. 6, the processor 131 of the display device 13 may be electrically connected to the controller 12, and the controller 12 may transmit the exercise data and/or operation instruction to the processor 131 in a wired or wireless manner.

During the implementation, the intelligent fitness system may further include a helmet, and an acceleration sensor 17 and a gyroscope 18 arranged on the helmet and electrically connected to the processor 131. The processor 131 is further configured to control the display module 132 to display the corresponding image in accordance with acceleration information acquired by the acceleration sensor 17 and angle information acquired by the gyroscope 18.

The acceleration sensor 17 is usually a three-axis acceleration sensor 17 capable of acquire acceleration information in three directions, i.e., an x-axis direction, a y-axis direction and a z-axis direction. Based on the acceleration information and the angle information acquired by the gyroscope 18, it is able to accurately determine a movement direction and a movement distance of the helmet, thereby to generate a corresponding operation instruction in accordance with the movement direction of the helmet and control an operational degree of the operation instruction in accordance with the movement distance. For example, in the case that the user is playing a competitive game through the display device 13, the movement direction of the helmet is determined through the acceleration sensor 17 and the gyroscope 18, so as to control a movement direction of a character in the game. To be specific, the left-right movement of the helmet may be used to represent the left-right movement of the character, and a movement distance of the helmet may be used to represent a movement degree of the character in the game. In this way, it is able to promote the head movement of the user, and meanwhile increase the pleasure of exercise.

Further, the display device 13 may be a VR display device or a AR display device.

In the case that the display device 13 is a VR or AR display device, the processor 131 may be a VR or AR video processor, and the display module 132 may have a resolution of 4K.

Through the VR or AR display device 13, it is able for the user to have a feeling of actually being there. Through the combination of the VR technique, the AR technique, the game design and the fitness device, it is able to further provide the intelligent fitness system with more functions, thereby to enable the user to have experience in outdoor riding in a virtual environment and match against a character in the virtual environment or, over a network, against any other user. In this way, it is able to provide the user with a feeling of being in the open air, remarkably improve the user experience and prevent the network game addiction thereby to provide a high-tech fitness system and increase the user stickiness.

Figure 7:
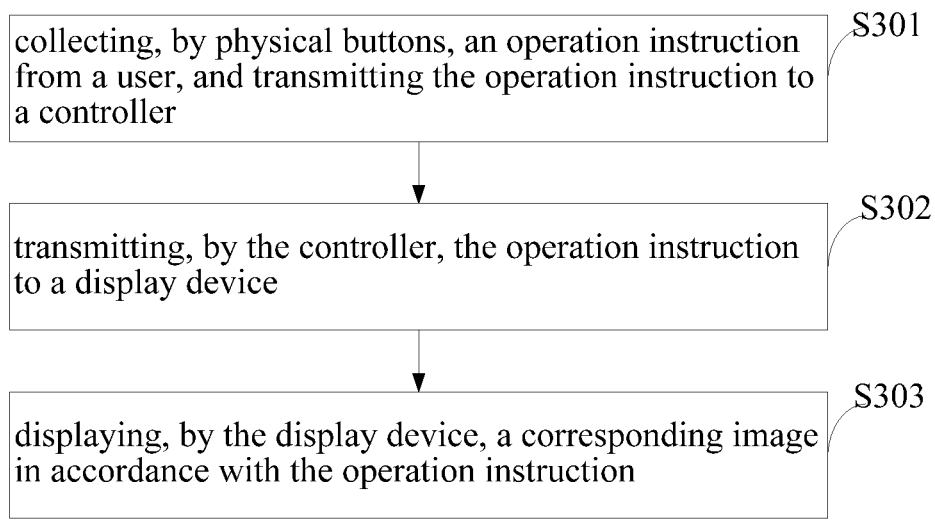
FIG. 7 is a flow chart of a control method of the intelligent fitness system according to one embodiment of the present disclosure.

Based on an identical inventive concept, the present disclosure further provides in some embodiments a control method of the above-mentioned intelligent fitness system. A principle of the control method is similar to that of the intelligent fitness system, so the implementation of the control method may refer to that of the intelligent fitness system. As shown in FIG. 7, the control method includes: Step S301 of collecting, by the physical buttons, an operation instruction from a user, and transmitting the operation instruction to the controller; Step S302 of transmitting, by the controller, the operation instruction to the display device; and Step S303 of displaying, by the display device, a corresponding image in accordance with the operation instruction.

According to the intelligent fitness system and the control method in the embodiments of the present disclosure, the plurality of physical buttons is fixed onto the handle of the fitness device at the positions corresponding to the fingers of the user, and the controller controls the display device to display the corresponding image in accordance with the operation instructions collected by the physical buttons, so as to enable the user to perform the corresponding operations on the display device in the case of taking exercise, provide more interaction modes and improve the user experience. In addition, the plurality of data collectors, such as the heart rate collector or, for the exercise bicycle, the velometer, is arranged on the fitness device, so as to provide the intelligent fitness system with more functions and more interaction modes. In addition, in the case that the display device is a VR or AR display device, it is able for the user to have a feeling of being actually there, thereby to increase the pleasure of exercise.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An intelligent fitness system, comprising:
an exercise bicycle,
a plurality of physical buttons arranged on a handle of the exercise bicycle at positions corresponding to fingers of a user respectively,
a controller electrically connected to the physical buttons,
a display device electrically connected to the controller, and
a plurality of data collectors fixed onto the exercise bicycle,
wherein each physical button is configured to collect an operation instruction from the user and transmit the operation instruction to the controller, the controller is configured to transmit the operation instruction to the display device, and the display device is configured to display a corresponding image in accordance with the operation instruction,
wherein each data collector is electrically connected to the controller and configured to acquire exercise data of the user and transmit the exercise data to the controller, the controller is further configured to transmit the exercise data to the display device, and the display device is further configured to display the corresponding image in accordance with the exercise data,
wherein the plurality of data collectors comprise a velometer fixed onto the exercise bicycle and configured to measure information about a rotational speed of each wheel of the exercise bicycle in the case that the wheel is rotating,
wherein the velometer comprises an infrared ray emitter and an infrared ray receiver fixed onto the exercise bicycle and located at two sides of the wheel respectively, and a plurality of convex structures fixed onto a rim of the wheel at a regular interval and configured to shield an infrared ray from the infrared ray emitter.

2. The intelligent fitness system according to claim 1, wherein the data collectors comprise a heart rate collector fixed onto the fitness device.

3. The intelligent fitness system according to claim 1, wherein the velometer comprises a plurality of permanent magnets fixed onto a rim of each wheel of the exercise bicycle at a regular interval, and a Hall sensor fixed onto the exercise bicycle and located within a magnetic field of the permanent magnets.

4. The intelligent fitness system according to claim 1, wherein the display device comprises a processor and a display module electrically connected to the processor, and the processor is configured to control the display module to display the corresponding image in accordance with the received exercise data and/or operation instruction.

5. The intelligent fitness system according to claim 4, further comprising a helmet, and an acceleration sensor and a gyroscope arranged on the helmet and electrically connected to the processor, wherein the processor is further configured to control the display module to display the corresponding image in accordance with acceleration information acquired by the acceleration sensor and angle information acquired by the gyroscope.

6. The intelligent fitness system according to claim 5, wherein the display device is a VR display device or AR display device.

7. The intelligent fitness system according to claim 4, wherein the display device is a virtual reality (VR) display device or augmented reality (AR) display device.

8. A control method of the intelligent fitness system according to claim 1, comprising steps of:
collecting, by the physical buttons, an operation instruction from a user, and transmitting the operation instruction to the controller;
transmitting, by the controller, the operation instruction to the display device; and
displaying, by the display device, a corresponding image in accordance with the operation instruction.

* * * * *